(12) United States Patent
Edwards et al.

(10) Patent No.: US 10,789,639 B2
(45) Date of Patent: Sep. 29, 2020

(54) SYSTEMS AND METHODS FOR SECURE MANAGEMENT OF A UNIVERSAL SHOPPING CART

(71) Applicant: Capital One Services, LLC, McLean, VA (US)

(72) Inventors: Joshua S. Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 142 days.

(21) Appl. No.: 16/056,675

(22) Filed: Aug. 7, 2018

(65) Prior Publication Data

US 2019/0272579 A1    Sep. 5, 2019

Related U.S. Application Data

(63) Continuation of application No. 15/909,713, filed on Mar. 1, 2018.

(51) Int. Cl.
| | |
|---|---|
| *G06Q 30/00* | (2012.01) |
| *G06Q 30/06* | (2012.01) |
| *G06Q 20/36* | (2012.01) |
| *G06Q 20/34* | (2012.01) |
| *G06Q 20/10* | (2012.01) |
| *G06N 20/00* | (2019.01) |

(52) U.S. Cl.
CPC ......... *G06Q 30/0633* (2013.01); *G06N 20/00* (2019.01); *G06Q 20/102* (2013.01); *G06Q 20/34* (2013.01); *G06Q 20/367* (2013.01); *G06Q 30/0639* (2013.01)

(58) Field of Classification Search
CPC .................................................. G06Q 30/06–08
USPC .............................................. 705/26.1–27, 2
See application file for complete search history.

(56) References Cited

U.S. PATENT DOCUMENTS

| | | | |
|---|---|---|---|
| 6,910,697 B2 | 6/2005 | Varatharajah et al. | |
| 9,171,328 B2 | 10/2015 | Argue et al. | |
| 2012/0173351 A1 | 7/2012 | Hanson et al. | |
| 2013/0103187 A1 | 4/2013 | Canter et al. | |
| 2014/0244442 A1 | 8/2014 | Hirsch | |
| 2014/0279266 A1* | 9/2014 | Lampert | G06Q 30/0629 705/26.64 |
| 2014/0365363 A1 | 12/2014 | Knudsen et al. | |
| 2018/0019984 A1* | 1/2018 | Isaacson | G06Q 20/12 |
| 2018/0084079 A1* | 3/2018 | Williams | H04W 4/21 |

* cited by examiner

*Primary Examiner* — Ethan D Civan
(74) *Attorney, Agent, or Firm* — Pillsbury Winthrop Shaw Pittman LLP

(57) ABSTRACT

The disclosed embodiments provide systems, methods, and techniques for managing transaction cards. User registration processes, order processes, and failure detection processes for a secure universal shopping cart are provided. Systems and methods may acquire identifiers. Systems and methods may also identify items associated with the identifiers. In addition, systems and methods may acquire a list of merchants that offer each item. Systems and methods may further determine, for each identifier, merchants based on user preferences. Even further, systems and methods may generate a payment token for each item. Systems and methods may then transmit the payment token for each item to its respective merchant.

20 Claims, 8 Drawing Sheets

SYSTEMS AND METHODS FOR SECURE MANAGEMENT OF A UNIVERSAL SHOPPING CART

CROSS-REFERENCE TO RELATED APPLICATIONS

This application is a continuation of U.S. patent application Ser. No. 15/909,713, filed Mar. 1, 2018. The content of the above-referenced disclosure is expressly incorporated herein by reference in its entirety.

TECHNICAL FIELD

The disclosed embodiments generally relate to systems and methods for information systems security, and more particularly, to systems and methods for securely managing a universal shopping cart.

BACKGROUND

Users often expect to purchase goods and services on the Internet according to their preferences (e.g., purchasing a good at the best price) securely. However, existing e-commerce platforms often fall short of the customer's expectations. For example, although e-commerce platforms selling goods and services are ubiquitous on the Internet, secure e-commerce platforms are not. E-commerce platforms are often not secure because merchants associated with e-commerce platforms fail to maintain the security of their e-commerce platforms. For example, merchants often fail to upgrade their e-commerce platforms, fix security flaws within their e-commerce platforms, and/or follow a policy of pushing only tested and secure changes of the e-commerce platform to the production environment (e.g., the production environment is where software and other products are actually put into operation for their intended uses by end users).

Moreover, existing e-commerce platforms often do not allow users to purchase goods and services on the Internet according to their preferences. Since most e-commerce platforms sell goods or services from one merchant, users are often deprived of the opportunity to buy goods and services, for example, at the lowest price from a wide array of merchants. And, even if an existing e-commerce platform offers the goods or services from multiple merchants, the e-commerce platform and/or its merchants are often aware of what prices other merchants are selling their goods and services. Thus, the e-commerce platform and/or merchants often collude, for example, to keep the price of a good high. Accordingly, these e-commerce systems may provide less desirable outcomes for users.

In view of these and other shortcomings and problems, a need exists to provide improved systems and techniques that allow users to securely purchase goods and services on the Internet according to their preferences.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address disadvantages of existing systems by providing the secure management of a universal shopping cart. For example, the disclosed embodiments reduce security flaws by utilizing a single platform to provide a universal shopping cart to users. The disclosed embodiments provide a way to communicate with multiple e-commerce platforms in order to provide users a one-stop shop to purchase goods and services. Additionally, the disclosed embodiments may avoid providing less desirable outcomes in view of the users' preferences by integrating their service with existing platforms that may be offering goods and services both on the universal shopping cart platform and by utilizing their own existing e-commerce solution. The disclosed embodiments also provide a way to process and generate payment tokens according to each merchant's e-commerce platform, regardless if its existing or new, to automatically purchase goods and services from each merchants in real-time and, in some embodiments, near simultaneously. The disclosed embodiments also provide a way to automatically purchase goods and services from particular merchants securely on the Internet according to users' preferences. That is, the disclosed embodiments may determine particular merchants to purchase a good or service from without receiving a specific selection of the merchants from users.

Certain disclosed embodiments provide systems for purchasing items using a universal shopping cart. For example, a system may include one or more memory devices storing instructions and one or more processors configured to execute instructions. The one or more processors may be configured to execute instructions to acquire, via a communication network, a first item identifier and a second item identifier, the first and second item identifiers being acquired via a user device. The one or more processors may also be configured to execute instructions to identify a first item associated with the first item identifier and a second item associated with the second item identifier. In addition, the one or more processors may be configured to execute instructions to acquire, via the communication network, a first plurality of merchants and a second plurality of merchants, wherein each of the first plurality of merchants offers the first item for sale, and wherein each of the second plurality of merchants offers the second item for sale. The one or more processors may further be configured to execute instructions to determine a first merchant from the first plurality of merchants based on a first user preference, the first user preference being associated with a user of the user device. Moreover, the one or more processors may be configured to execute instructions to determine a second merchant from the second plurality of merchants based on a second user preference, the second user preference being associated with the user. The one or more processors may also be configured to execute instructions to generate a first payment token and a second payment token, the first payment token being generated to purchase the first item from the first merchant and the second payment token being generated to purchase the second item from the second merchant. Even further, the one or more processors may be configured to execute instructions to transmit, via the communication network, the first payment token to the first merchant and the second payment token to the second merchant.

Aspects of the disclosed embodiments may also include a method or a non-transitory tangible computer-readable medium that stores software instructions that, when executed by one or more processors, are configured for and capable of performing and executing one or more of the methods, operations, and the like consistent with disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
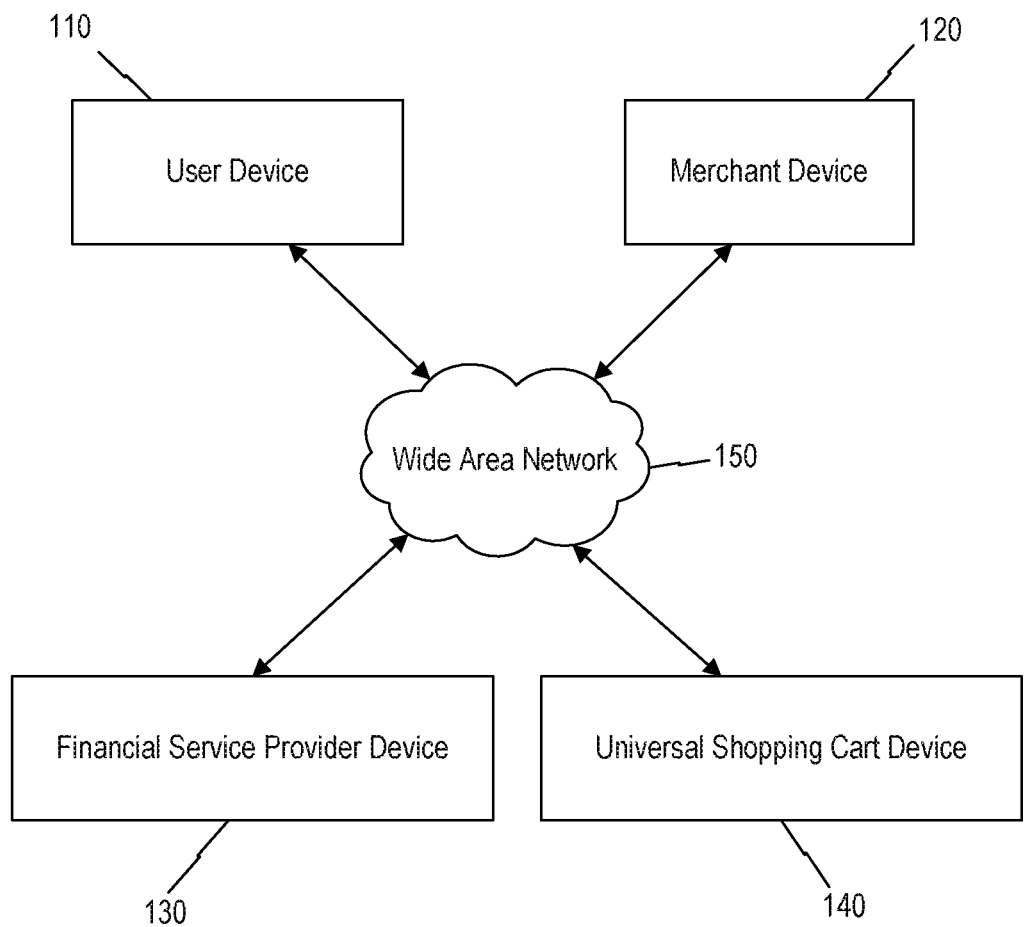
FIG. 1 is a block diagram of an exemplary universal shopping cart system environment, consistent with disclosed embodiments.

The disclosed embodiments generally relate to systems and methods for information systems security. In particular, the disclosed embodiments relate to systems and methods for securely managing a universal shopping cart. For instance, the disclosed embodiments allow users (e.g., customers) to purchase items from multiple merchants using a single platform securely (e.g., a universal shopping cart.).

As an example, the disclosed embodiments may involve a scenario where a user intends to purchase two items (e.g., a toothbrush and a hairbrush) from among a plurality of merchants using a universal shopping cart. The user may input item identifiers associated with the item, such as text, videos, universal product codes (UPCs), etc., to search for each item using the universal shopping cart. The universal shopping cart may then identify the items that user wishes to buy (e.g., the toothbrush and hairbrush).

For each item, the universal shopping cart may identify a list of merchants and each merchant's selling price to the user. Then, for each item, the user and/or the universal shopping cart, may determine or select to purchase the item from a particular merchant. For example, in some embodiments, the universal shopping cart may determine to purchase the item based on a user preference, such as one that indicates that the user would like to purchase the item at the lowest price. Thus, in this scenario, the universal shopping cart may choose to select, for each item, the merchant selling the item at the lowest cost. In some scenarios, a merchant that is selected for purchasing the first item may be different from the merchant that is selected for purchasing the second item.

After determining or selecting to purchase the items from particular merchants, the universal shopping cart may generate a payment token for each item. The payment token may include, for example, data associated with the particular item, the particular merchant from which the item will be purchased, the form of payment used to purchase the item, the price of the item, and/or shipment of the item. The universal shopping cart may then transmit the payment token to each of the respective merchants in order to purchase the items from the different merchants. Depending on the technological infrastructure of the merchant, the universal shopping cart may have to transmit the payment token to each merchant differently. Thereby, the universal shopping cart may transmit the payment token, according to the technological infrastructure of the merchant, in order to submit the payment successfully.

In some embodiments, the universal shopping cart may receive a notification, such as a notification indicating that payment for an item was submitted successfully, an order has been shipped, etc., from one or more of the merchant systems. In some scenarios, the universal shopping cart may receive or determine that an error has occurred in generating the payment token or transmitting the payment token to the merchant. In response to receiving or determining that an error has occurred, the universal shopping cart may follow one or more security schemes to, for example, fix the error, inform the user, reorder the item from a different merchant, refund the user, etc.

The following detailed description encompasses the scenario above as well as many other scenarios. The detailed description also refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 shows a block diagram of an exemplary universal shopping cart management system environment 100 for managing a universal shopping cart, consistent with disclosed embodiments. The components and arrangements shown in FIG. 1 are not intended to limit the disclosed embodiments, as the components used to implement the disclosed processes and features may vary.

In accordance with disclosed embodiments, system environment 100 may include one or more user devices 110, one or more merchant devices 120, one or more financial service provider devices 130, one or more universal shopping cart devices 140, one or more wide area networks (WAN) 150, and/or one or more local networks. Other components known to one of ordinary skill in the art may be included in system environment 100 to gather, process, transmit, receive, acquire, and provide information used in conjunction with the disclosed embodiments. In addition, system environment 100 may further include other components that perform or assist in the performance of one or more processes that are consistent with disclosed embodiments.

In some embodiments, system environment 100 may include one or more user devices 110. A customer may operate user device 110, which may be a desktop computer, a laptop, a tablet, a smartphone, a multifunctional watch, a pair of multifunctional glasses, a tracking device, or any suitable device with computing capability. User device 110 may comprise a memory, a processor, and/or other specialized hardware that is configured to execute one or more methods of the disclosed embodiments. User device 110 may have an application installed thereon, which may enable user device 110 to communicate with merchant device 120 and/or with financial service provider device 130 via WAN 150 and/or a local network. Alternatively, user device 110 may connect to financial service provider device 130 and/or to merchant device 120 through use of web browser software. While system environment 100 is shown in FIG. 1 with one user device 110, the disclosed embodiments may be implemented in a system including any number of user devices 110.

User device 110 may allow a user to access information stored in financial service provider device 130, which may include, for example, financial information related to recent purchase transactions, financial discounts, financial statements, account information, merchandising program information, transaction card information, universal shopping cart information, and/or the like. User device 110 may also include a Global Positioning System (GPS) unit (not pictured). In some embodiments, user device 110 may use the GPS unit to acquire and transmit the position information, such as the physical location of user device 110, to merchant device 120 and/or to financial service provider device 130. An exemplary computer system consistent with user device 110 is discussed in additional detail with respect to FIG. 2.

A user may operate user device 110 to perform one or more operations consistent with disclosed embodiments. In one aspect, a user may be a customer of a financial service provider that may be associated with financial service provider device 130. For instance, a financial service provider may maintain a financial service account (e.g., credit card account) for the customer that the customer may use to purchase goods and/or services online or at brick-and-mortar locations associated with a merchant. In another aspect, a user may also be a customer of a merchant that is associated with merchant device 120. For instance, a user may operate user device 110 to initiate purchase transactions with a merchant via merchant device 120 and receive communications associated with a transaction card. Additionally, in certain embodiments, a user may operate user device 110 to view a financial service account or financial statement provided by a financial service provider or financial service provider device 130.

In some embodiments, system environment 100 may include one or more merchant devices 120. Merchant device 120 may be a computing system that is associated with a merchant or other business entity such as a retailer, a grocery store, a service provider (e.g., utilities, etc.), or any other type of entity that provides goods and/or services that customers may purchase. While system environment 100 is shown in FIG. 1 with one merchant device 120, the disclosed embodiments may be implemented in a system including two or more merchant devices 120 associated with any number of underlying business entities. Further, merchant device 120 is not limited to conducting business in any particular industry or field.

Merchant device 120 may be associated with a merchant brick-and-mortar location that a user may physically visit to purchase goods and/or services from a merchant. Such physical locations may include merchant devices 120, which may include computing systems that perform financial service transactions with customers (e.g., Point of Sale (POS) terminals, kiosks, etc.). Merchant device 120 may also include back- and/or front-end computing components that store data and execute software instructions to perform operations consistent with disclosed embodiments, such as computers that are operated by employees of the merchant (e.g., back-office systems, etc.). Merchant device 120 may also be associated with a merchant that provides goods and/or services via known online or e-commerce type of solutions. For example, such a merchant may sell goods via a website using known online or e-commerce systems and solutions to market, sell, and process online transactions.

Merchant device 120 may include one or more servers or other type of computing systems configured to execute software instructions stored in memory to perform one or more processes consistent with disclosed embodiments. For example, merchant device 120 may include one or more memory devices storing data and software instructions and one or more processors configured to use the data and execute the software instructions to perform server-based functions and operations known to those skilled in the art. In some embodiments, merchant device 120 may have an application installed thereon to perform one or more processes that are consistent with disclosed embodiments.

Further, merchant device 120 may include servers that are configured to execute stored software instructions to perform operations associated with a merchant, including processes associated with handling purchase transactions, generating transaction data, generating item data (e.g., an item identifier, item name, item description, etc.) relating to purchase transactions, etc. Merchant device 120 may include one or more servers that may be a general-purpose computer, a mainframe computer, or any combination of these components. In certain embodiments, merchant device 120 (or a system including merchant device 120) may be configured as an apparatus, system, or the like based on the storage, execution, and/or implementation of the software instructions that perform one or more operations consistent with disclosed embodiments. Merchant device 120 may be standalone or part of a subsystem included in a larger system. For example, merchant device 120 may include distributed servers that are remotely located and communicate over a network (e.g., WAN 150 or local network. An exemplary computer system consistent with merchant device 120 is discussed in additional detail with respect to FIG. 2.

In some embodiments, system environment 100 may also include one or more financial service provider devices 130. Financial service provider device 130 may be a system associated with a financial service provider (not shown), such as a bank, a credit card company, a lender, brokerage firm, or any other type of financial service entity that generates, provides, manages, maintains financial service accounts, manages transaction cards, etc., for customers. Financial service provider device 130 may be one or more computing systems that are configured to execute software instructions stored on one or more memory devices to perform one or more operations consistent with disclosed embodiments. For example, financial service provider device 130 may include memory devices storing data and software instructions and processors configured to use the data and execute the software instructions to perform server-based functions and operations known to those skilled in the art. Financial service provider device 130 may include one or more general-purpose computers, mainframe computers, or any combination of these types of components. In some embodiments, financial service provider device 130 may have an application installed thereon to perform processes that are consistent with disclosed embodiments.

In certain embodiments, financial service provider device 130 may be configured as a particular apparatus, system, or the like based on the storage, execution, and/or implementation of the software instructions that perform operations consistent with disclosed embodiments. Financial service provider device 130 may be standalone, or it may be part of a subsystem included in a larger system. For example, financial service provider device 130 may include distributed servers that are remotely located and communicate over a network (e.g., WAN 150 and/or a local network) or a dedicated network of a financial service provider. An exemplary computing system consistent with financial service provider device 130 is discussed in additional detail with respect to FIG. 2, below.

Financial service provider device 130 may include or may access one or more storage devices configured to store data and/or software instructions used by one or more processors of financial service provider device 130 to perform operations consistent with disclosed embodiments. For example, financial service provider device 130 may include memory configured to store one or more software programs that perform several functions when executed by a processor. The disclosed embodiments are not limited to separate programs or computers configured to perform dedicated tasks. For example, financial service provider device 130 may include memory that stores a single program or multiple programs. Additionally, financial service provider device 130 may execute one or more programs located remotely from financial service provider device 130. For example, financial service provider device 130 may access one or more remote programs stored in memory included with a remote component that, when executed, perform operations consistent with disclosed embodiments. In certain aspects, financial service provider device 130 may include server software that generates, maintains, and provides services associated with transaction card management. In other aspects, financial service provider device 130 may connect separate servers or similar computing systems that generate, maintain, and provide services associated with financial data for a financial service provider associated with financial service provider device 130.

In some embodiments, system environment 100 may also include one or more universal shopping cart devices 140. Universal shopping cart device 140 may communicate with user device 110, merchant device 120, and/or financial service provider 130. Universal shopping cart device 140 may be one or more computing systems that are configured to execute software instructions stored on one or more memory devices to perform one or more operations consistent with disclosed embodiments. For example, universal shopping cart device 140 may include memory devices storing data and software instructions and processors configured to use the data and execute the software instructions to perform server-based functions and operations known to those skilled in the art. Universal shopping cart device 140 may include one or more general-purpose computers, mainframe computers, or any combination of these types of components. While system environment 100 is shown in FIG. 1 with one universal shopping cart device 140, the disclosed embodiments may be implemented in a system including any number of universal shopping cart devices 140.

Universal shopping cart device 140 may be configured as a particular apparatus, system, and the like based on the storage, execution, and/or implementation of the software instructions that perform operations consistent with disclosed embodiments. Universal shopping cart device 140 may be standalone, or it may be part of a subsystem included in a larger system. For example, universal shopping cart device 140 may include distributed servers that are remotely located and communicate over a network (e.g., WAN 150 and/or a local network) or a dedicated network of universal shopping cart devices 140. In some embodiments, universal shopping cart device 140 may have an application installed thereon to perform processes that are consistent with disclosed embodiments. Parts of universal shopping cart device 140, such as computing systems and/or functionality as described below, may be implemented by and/or on user device 110, merchant device 120, and/or financial service provider device 130, which may include being implemented in an application installed on user device 110, merchant device 120, and/or financial service provider device 130. An exemplary computing system consistent with financial service provider device 130 is discussed in additional detail with respect to FIG. 2, below.

Universal shopping cart device 140 may aggregate data from one or more merchant devices 120. Universal shopping cart device 140 may also provide payment information from one or more financial service provider devices 130, which may be associated with one or more user device 110, to one or more merchant devices 120. In some embodiments, universal shopping cart device 140 may allow a user of user device 110 to provide registration information, transaction card information, or any other information to enable universal shopping cart device 140 to perform one or more methods and/or techniques consistent with disclosed embodiments. Universal shopping cart device 140 may authorize a user and/or user device 110 to make one or more purchases via universal shopping cart device 140. Universal shopping cart device 140 may, in some embodiments, allow a user associated with user device 110 to make purchases from merchants associated with one or more merchant devices 120. Universal shopping cart device 140 may also be able to make different purchases from different merchants as well as pay different merchants associated with the one or more merchant devices 120 among other disclosed techniques in accordance with disclosed embodiments.

WAN 150 may comprise any computer networking arrangement used to exchange data. For example, WAN 150 may be the Internet, a private data network, a virtual private network (VPN) using a public network, and/or other suitable connections that enable the components of system environment 100 to send and acquire information. WAN 150 may also include a public switched telephone network ("PSTN") and/or a wireless network such as a cellular network, wired Wide Area Network, Wi-Fi network, or other known wireless networks (e.g., WiMAX) capable of bidirectional data transmission.

WAN 150 may be connected to one or more local networks. Local network may comprise any type of computer networking arrangement used to exchange data in a localized area, such as Wi-Fi based on IEEE 802.11 standards, Bluetooth™' Ethernet, and other suitable network protocols that enable components of system environment 100 to interact with one another and to connect to WAN 150 for interacting with components in system environment 100. In some embodiments, the local network comprises a portion of WAN 150. In other embodiments, components of system environment 100 may communicate via WAN 150 without a separate local network.

Figure 2:
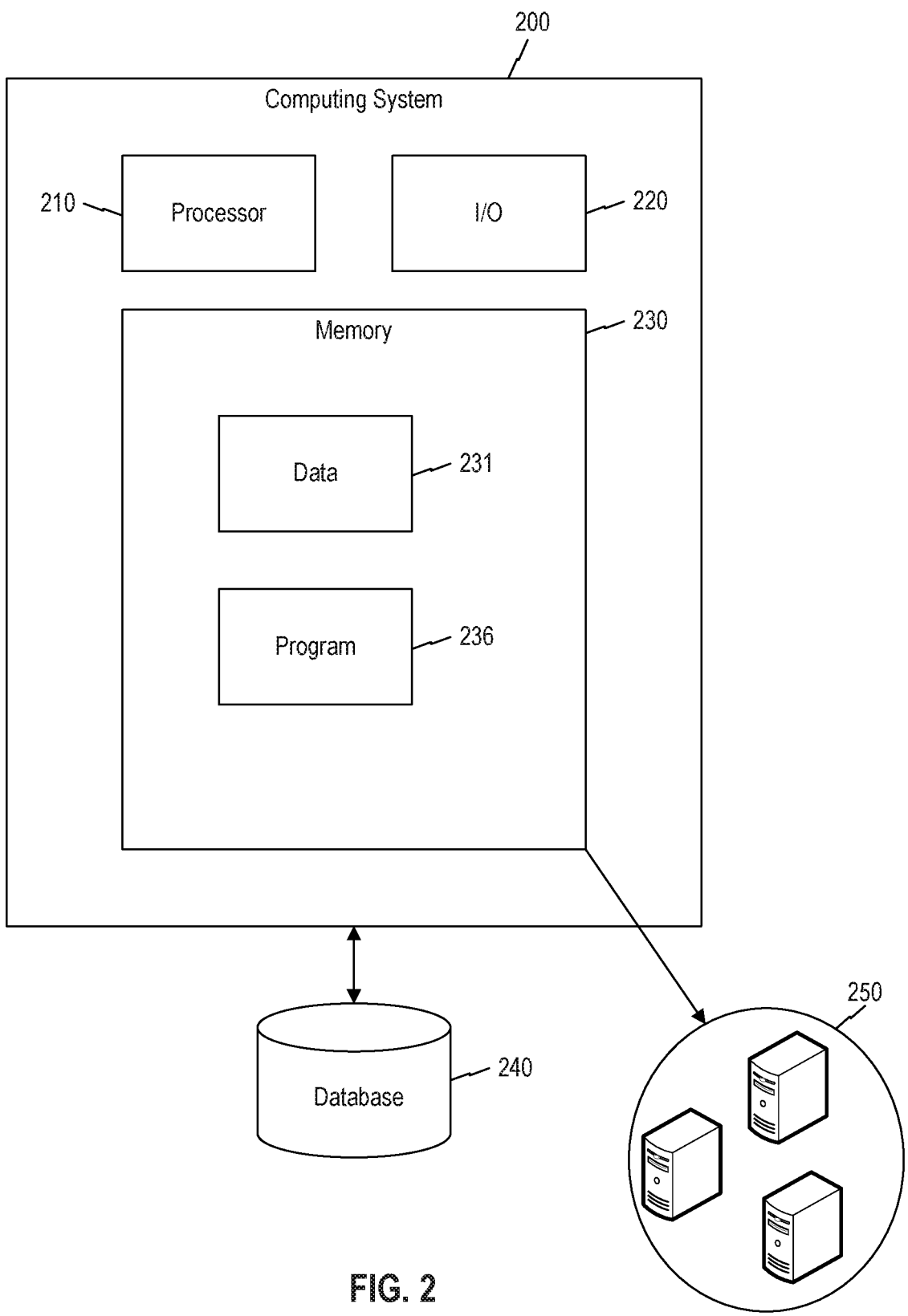
FIG. 2 is a block diagram of an exemplary computer system, consistent with disclosed embodiments.

FIG. 2 shows a block diagram of an exemplary computing system 200 illustrating a computing system configuration that may be associated with user device 110, merchant device 120, financial service provider device 130, and/or universal shopping cart device 140, consistent with disclosed embodiments. In some embodiments, computing system 200 may have one or more processors 210, one or more input/output (I/O) devices 220, one or more memories 230, one or more databases 240, and/or one or more cloud servers 250. Memory 230 may include data 231 (which may include transaction data, merchant data, user data, and/or other data), and/or programs 236.

In some embodiments, computing system 200 may take the form of a server, a general-purpose computer, a mainframe computer, a laptop, a smartphone, a mobile device, or any combination of these components. In certain embodiments, computing system 200 (or a system including computing system 200) may be configured as a particular apparatus, system, and the like, based on the storage, execution, and/or implementation of the software instructions that perform one or more operations consistent with disclosed embodiments. Computing system 200 may be standalone, or it may be part of a subsystem included in a larger system.

Processor 210 may include one or more known processing devices, for example, a microprocessor from the Pentium™ or Xeon™ family manufactured by Intel™, the Turion™ family manufactured by AMD™ or any of various processors manufactured by Sun Microsystems or other manufacturers. Processor 210 may constitute a single-core or multiple-core processor that executes parallel processes simultaneously. For example, processor 210 may be a single-core processor configured with virtual processing technologies. In certain embodiments, processor 210 may use logical processors to execute and control multiple processes simultaneously. Processor 210 may implement virtual machine technologies or other known technologies to provide the ability to execute, control, run, manipulate, store, etc., multiple software processes, applications, programs, etc. In certain embodiments, processor 210 may include a multiple-core processor arrangement (e.g., dual, quad-core, etc.) configured to provide parallel processing functionalities to allow computing system 200 to execute multiple processes simultaneously. One of ordinary skill in the art would understand that other types of processor arrangements could be implemented for providing the capabilities disclosed herein. The disclosed embodiments are not limited to any type of processor(s) configured in computing system 200.

Memory 230 may include one or more storage devices configured to store data and instructions used by processor 210 to perform functions related to the disclosed embodiments. For example, memory 230 may be configured with software instructions, such as program 236 that may perform operations when executed by processor 210. The disclosed embodiments are not limited to separate programs or computers configured to perform dedicated tasks. For example, memory 230 may include a single program 236 that performs the functions of computing system 200, or program 236 could comprise multiple programs. Additionally, processor 210 may execute one or more programs located remotely from computing system 200. For example, user device 110, merchant device 120, financial service provider device 130, and/or universal shopping cart device 140 may, via computing system 200 (or variants thereof), may access one or more remote programs that, when executed, may perform functions related to certain disclosed embodiments. Processor 210 may further execute one or more programs located in database 240 and/or cloud service 250. In some embodiments, program 236 may be stored in an external storage device, such as at cloud service 250 located outside of computing system 200, and processor 210 may execute program 236 remotely.

Programs 236 executed by processor 210 may cause processor 210 to execute one or more processes related to providing a secure universal shopping cart, including, but not limited to aggregating items from merchants, processing credit and debit card transactions securely, authorizing users, analyzing items based on user preferences, adding items to carts, and other processes and techniques associated with managing a universal shopping cart securely.

I/O device 220 may be one or more devices configured to allow data to be acquired and/or transmitted by computing system 200. I/O device 220 may include one or more digital and/or analog communication devices that allow computing system 200 to communicate with other machines and devices, such as other components of system environment 100 shown in FIG. 1. For example, computing system 200 may include interface components that may provide interfaces to one or more input devices, such as keyboards, mouse devices, and the like, which may enable computing system 200 to acquire one or more inputs from an operator of financial service device 130 (FIG. 1).

Memory 230 may also store data that may reflect any type of information in any format that the system may use to perform operations consistent with disclosed embodiments. Memory 230 may store instructions to enable processor 210 to execute one or more applications, such as server applications, an application that manages a universal shopping cart, network communication processes, and any other type of application or software. Alternatively, the instructions, application programs, etc., may be stored in external storage (not shown) in communication with computing system 200 via WAN 150 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include data 231. Data 231 may include, for example, transaction data, merchant data, user data, and other data. Transaction data may include information related to purchasing transactions initiated by a user. For example, transaction data may include payment tokens. Payment tokens may comprise a user identifier, a purchase price, a transaction identifier, a merchant identifier, etc. The user identifier may be a credit or debit card number, an account number, or other means of identifying a user initiating the purchase transaction. The purchase price may include a number representing the total sale price of the purchase transaction and/or may include a list of the various items purchased from the merchant. In some embodiments, merchant device 120 may collect, generate, and provide transaction data relating to purchase transactions involving a user of financial service provider device 130. In some embodiments, merchant device 120 may further provide item data (e.g., an item identifier, item name, item description, etc.) and transaction data relating to purchase transactions involving a user to financial service provider device 130. Merchant device 120 may provide this information to financial service provider device 130 via WAN 150. In some embodiments, transaction data may be stored in database 240 and/or cloud service 250 or in external storage (not shown) in communication with computing system 200 via WAN 150 or any other suitable network.

Data 231 may further include merchant data. Merchant data may include information about particular merchants associated with merchant device 120. For example, merchant data may include merchant identifiers, merchant account information, forms of payment the merchant accepts, and/or the like. Merchant data may also include one or more merchant profiles or data associated with one or more merchant websites, such as authentication data for connecting and logging into a particular merchant website (e.g., using techniques associated with open authentication, such as OAuth™, OpenID™, SAML™, etc.). When a user initiates a purchase transaction, processor 210 may analyze merchant data or merchant profiles before providing or authorizing the purchase transaction on behalf of a user. In some embodiments, merchant data may be stored in database 240 and/or cloud service 250 or in external storage (not shown) in communication with computing system 200 via WAN 150 or any other suitable network.

Data 231 may further include user data. User data may include information about particular customers of the financial service provider. For example, user data may include customers' account information, debit or credit card information, history of purchase transactions, financial statements, credit score, risk profile, and/or transaction card data. User data may further contain one or more user profiles associating the account information, debit or credit card information, history of purchase transactions, financial statements, credit score, risk profile, and/or transaction card information, including stored transaction cards. User data may also include one or more user preferences that may indicate a user preference for purchasing items. When a user initiates a purchase transaction, processor 210 may analyze user data or user profiles before authorizing the purchase transaction on behalf of a user. In some embodiments, user data may be stored in database 240 and/or cloud service 250 or in external storage (not shown) in communication with computing system 200 via WAN 150 or any other suitable network.

Data 231 may further include other data. Other data may be any data associated with managing a secure universal shopping cart in accordance with disclosed embodiments. For example, other data may consist of processing or tracking information with regards to various processing techniques, that is, other data may include, for example, data, time, number of seconds to complete a process or step, an expiration date associated with a particular step and/or technique used in accordance with some embodiments. Other data may also include data, such as breadcrumbs, associated how a user navigates programs 236 associated with managing the secure universal shopping cart. In some embodiments, other data may also include logging information, such as information associated with errors or warnings generated by programs 236 and/or any other components in FIG. 1 and FIG. 2.

Processor 210 may analyze transaction data in reference to user data. For example, processor 210 may analyze transaction data to determine which user with information stored in user information 234 is initiating the purchase transaction. Processor 210 may access the particular user's user information to determine their account information, debit or credit card information, history of purchase transactions, financial statements, credit score, risk profile, and/or transaction card information.

Computing system 200 may also contain one or more databases 240. In some embodiments, computing system 200 may be communicatively connected to database 240 through WAN 150. Database 240 may include one or more memory devices that store information and are accessed and/or managed through computing system 200. By way of example, database 240 may include Oracle™ databases, Sybase™ databases, or other relational databases or non-relational databases, such as Hadoop sequence files, HBase, Cassandra, etc. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to acquire and process requests for data stored in memory devices of database(s) 240 and to provide data from database 240.

Computing system 200 may be communicatively connected to one or more cloud service(s) 250. In some embodiments, computing system 200 may be communicatively connected to cloud service 250 through WAN 150 and/or a local network. Cloud service 250 may include a physical and/or virtual storage system associated with cloud storage for storing data and providing access to data via a public network, such as the Internet. Cloud service 250 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via WAN 150. In some embodiments, cloud service 250 comprises multiple computer systems spanning multiple locations and having multiple databases or multiple geographic locations associated with a single or multiple cloud storage service(s). As used herein, cloud service 250 refers to physical and virtual infrastructure associated with a single cloud storage service and may manage and/or store data associated with managing transaction card reminders.

As discussed above, universal shopping cart device 140 may include at least one computing system 200. Further, it should be understood that variations of computing system 200 may be used by other components of system environment 100, including user device 110, merchant device 120, and/or financial service provider device 130. In some embodiments, computing system 200 may be a single server or may be configured as a distributed computer system including multiple servers or computers that interoperate to perform one or more of the processes and functionalities associated with the disclosed embodiments.

Figure 3:
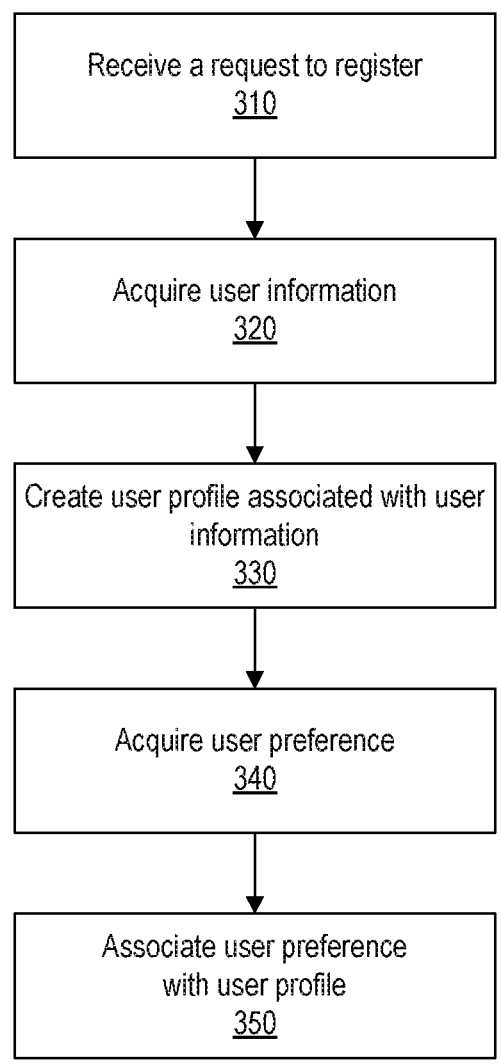
FIG. 3 is a flowchart illustrating an exemplary user registration process, consistent with disclosed embodiments.

FIG. 3 is a flowchart illustrating an exemplary user registration process 300 in accordance with disclosed embodiments. In some embodiments, processor 210 of, for example, universal shopping cart device 140, may execute instructions encoded on a computer-readable storage medium to perform steps of user registration process 300. It should also be understood, however, that one or more steps of user registration process 300 may be implemented by other components of system environment 100 (shown or not shown), including user device 110, merchant device 120, and/or financial service provider device 130.

At step 310, universal shopping cart device 140 may receive a request to register a user with a universal shopping cart device 140. Universal shopping cart device 140 may receive the request via user device 110. In some embodiments, a portal or any other computing system may send the request to universal shopping cart device 140. Universal shopping cart device 140 may provide the portal to user device 110 or any other computing system associated with the user.

At step 320, universal shopping cart device 140 may acquire (e.g., request and receive) user information associated with the user. User information may include information, such as demographic information, characteristics, (e.g., interests, hobbies, favorite items, movies, etc.), financial account information, merchant account information, user device information (IP address, MAC address, device type, GPS location, etc. of user device 110), and/or user preferences. User information may also include user log-in credentials, such as the user's email address, password, username, user identifier, or the like. In some embodiments, universal shopping cart device 140 may acquire one or more of the user log-in credentials by creating the credentials automatically; in other embodiments, universal shopping cart device 140 may acquire one or more of the user log-in credentials by acquiring input from the user. The user log-in credentials may allow universal shopping cart device 140 to provide secure, subsequent uses when a particular user accesses the universal shopping cart device 140. In some embodiments, universal shopping cart device 140 may acquire the user information when a user employs one or more user devices 110 to communicate with universal shopping cart device 140.

Universal shopping cart device 140 may acquire user information from the user (e.g., via user device 110). Additionally or alternatively, universal shopping cart device 140 may acquire user information from any other computing system, such as financial service provider 130. For example, universal shopping cart device 140 may request and receive user information, which may include financial service account information from the user. In some embodiments, universal shopping cart device 140 may receive information from the user that allows the universal shopping cart device 140 to interface with and receive information from one or more financial service providers 130 for which the user is a customer.

The financial service account information may include the identity of the financial service account provider, the identity of a financial service account, and/or credentials that enable universal shopping cart device 140 to access, receive, and/or store information relating to the user's financial account. In some embodiments, universal shopping cart device 140 may utilize open source technology, such as OAuth™, OpenID™, SAML™, etc., that provides open authentication between different devices, websites, applications, and/or systems. Universal shopping cart device 140 may acquire an authentication token from one or more financial service provider devices 130 to access, receive, and/or store information related to the merchant account information.

Additionally or alternatively, universal shopping cart device 140 may receive information from the user allowing universal shopping cart device 140 to access one or more financial management systems (e.g., Quicken, Mint.com, etc.), which may store information (including log-in credentials for one or more financial service accounts) associated with one or more of the user's financial accounts. In some embodiments, universal shopping cart device 140 may obtain (e.g., via user device 110) credentials for accessing user financial account(s) via screen scraping during a user log-in procedure, keystroke logging during a user log-in procedure, accessing password files stored on one or more user device(s), etc.

The universal shopping cart device 140 may use the received financial service account information to access the financial management systems and identify, access, and/or store data associated with financial transaction data, spending habits, etc. of the user. In some embodiments, universal shopping cart device 140 may use the financial service account information to communicate with financial service provider device 130 to configure a communication protocol and/or link that enables universal shopping cart device 140 to receive information from the financial service provider system 130 relating to purchase transactions made by the user using a financial service account provided by financial service account provider 130. In some embodiments, the user may provide the universal shopping cart device 140 with authorization to directly access financial service account information. For example, universal shopping cart device 140, may be a part of financial service provider 130, and may directly access (i.e., access without user log-in credentials) data stores of the user's financial service providers(s), including data stores associated with the user's financial service account information.

As another example, universal shopping cart device 140 may acquire user information from merchant device 120. In some embodiments, universal shopping cart device 140 may receive information from the user that allows the universal shopping cart device 140 to interface with and receive information from one or more merchant devices 120 for which the user is a customer.

The merchant account information may include the identity of the merchant account provider, the identity of a merchant account associated with the user, and/or credentials that enable universal shopping cart device 140 to access, receive, and/or store information relating to the user's merchant account. In some embodiments, universal shopping cart device 140 may utilize open source technology, such as OAuth™, OpenID™, SAML™, etc., that provides open authentication between different devices, websites, applications, and/or systems. Universal shopping cart device 140 may acquire an authentication token from one or more merchant devices 120 to access, receive, and/or store information related to the merchant account information. Merchant account information may also include transactions that the user made with the merchant as well as discounts, promotions, and/or offers provided by the merchant to the user. Merchant account information may further include interactions between the user and the merchant, such as open carts (e.g., carts that a user may have abandoned for a particular time period without completing the checkout process), pending items in a user's cart, refunded items, shipping address, changes of shipping address, user ratings, etc.

At step 330, universal shopping cart device 140 may create a user profile associated with the user information. In some embodiments, universal shopping cart device 140 may associate (e.g., as a friend, as a family member, as an associate, etc.) the user with one or more users based on information reflected in the user profile (e.g., user information). Universal shopping cart device 140 may use the user profile information to create, update, edit, or otherwise manage a secure universal shopping cart associated with the user. Universal shopping cart device 140 may use the user profile information to modify one or more of the user information.

At step 340, universal shopping cart device 140 device may acquire one or more user preferences. User preferences may include preferences, such as preferences to purchase items at the most or least expensive price, using the most or least expensive shipping method, using the longest or quickest shipping methods, using or not using particular merchants, using the most or least discounts and/or promotions, etc. User preferences may be determined by acquiring the preference from user device 110 via user input.

Additionally or alternatively, user preferences may also be acquired by using one or more similar techniques for acquiring user information, as described, for example, in steps 320. User preferences may also be acquired based on determining the most common preference of a group of users associated with the user profile. For example, if a certain preference cannot be identified for user A, universal shopping cart device 140 may determine that preference for user A based on preferences common to users B and C when users B and C are associated with user A. Additionally or alternatively, user preferences may also be acquired along with user information (acquired step 320) or the request (received in step 310). At step 350, universal shopping cart device 140 may associate the user preferences with the user profile for a particular user and/or a particular set of associated users.

Figure 4:
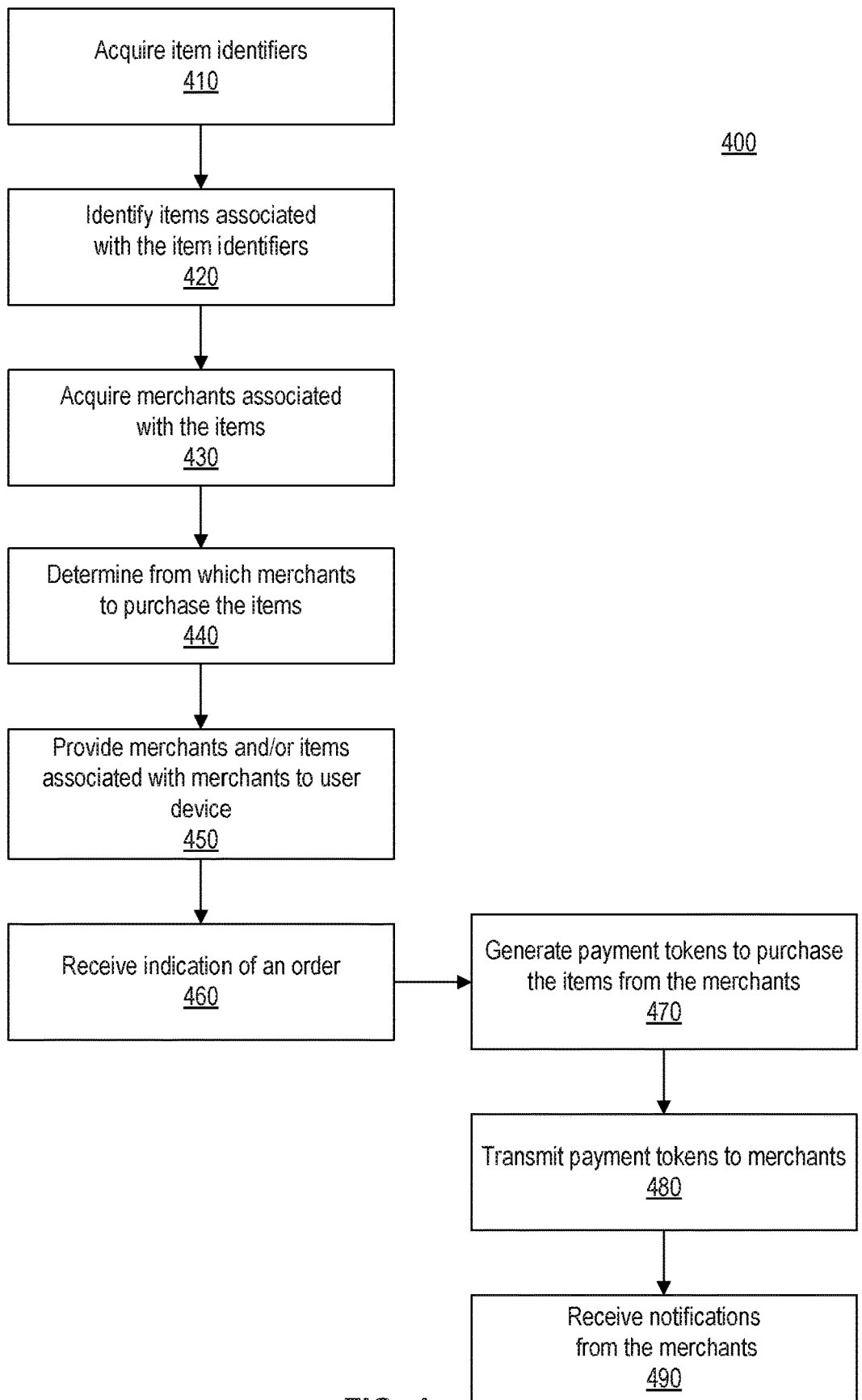
FIG. 4 is a flowchart illustrating an exemplary order process, consistent with disclosed embodiments.

FIG. 4 is a flowchart illustrating an exemplary order process 400 in accordance with disclosed embodiments. In some embodiments, processor 210 of, for example, universal shopping cart device 140 may execute instructions encoded on a computer-readable storage medium to perform steps of the order process 400. It should also be understood, however, that one or more steps of order process 400 may be implemented by other components of system environment 100 (shown or not shown), including user device 110, merchant device 120, and/or financial service provider device 130.

At step 410, universal shopping cart device 140 may acquire one or more item identifiers associated with one or more items. An item identifier may include a universal product code (UPC), a stock keeping unit (SKU), a quick response code (QR code), an image, a video, an e-mail, a voice message, a text input, a sound, and/or the like. Universal shopping device 140 may acquire an item identifier from user device 110. In some embodiments, universal shopping device 140 may acquire the item identifier by a user operating user device 110.

In a number of embodiments, the user of user device 110 may capture an item identifier via one or more I/O devices, such as cameras, microphones, keyboards, antennas, etc., of user device 110. The user may send the item identifiers to universal shopping cart device 140 over WAN 150 and/or a local network to universal shopping cart 140. Additionally, universal shopping cart device 140 may register the user of user device 110 using one or more steps, as described above, of order process 300. Alternately, universal shopping cart device 140 may not register the user of user device 110.

At step 420, universal shopping cart device 140 may identify one or more items associated with one or more acquired item identifiers. It should be understood that universal shopping cart device 140, in some embodiments, may identify other item identifiers (e.g., associated item identifiers) that are associated with the item identifier acquired at step 410. Universal shopping cart device 140 may acquire an item identifier in step 410, identify an item identifier associated with the acquired item identifier, and identify an item associated with the acquired item identifier by using the associated item identifier.

For example, if universal shopping cart device 140 acquired an image of a barcode at step 410, universal shopping cart device 140 may determine the UPC (e.g., an associated item identifier) from the image of a barcode. Universal shopping cart device 140 may determine the UPC, in some embodiments, by comparing the image of the barcode to a set of stored images of the barcodes. Universal shopping cart device 140 may acquire the set of stored images by searching one or more databases, servers, and/or cloud services (e.g., database 240, cloud service 250, etc.), conducting an internet look-up, utilizing an application programmable interface, or using any other techniques known by one of ordinary skill in the art. In certain embodiments, universal shopping cart device 140 may utilize open-source and/or commercial applications to determine the UPC code from the captured image, such as a barcode reader and/or scanner application. After determining the UPC code, universal shopping cart device 140 may then identify an item associated with the item identifier based on the UPC.

As another example, if universal shopping cart device 140 acquires an image of a QR code at step 410, universal shopping cart device 140 may determine a UPC, an SKU, an internet address, and/or another associated item identifier from the image of the QR code. In some embodiments, universal shopping cart device 140 may utilize open-source and/or commercial applications to determine the UPC, SKU, internet address, and/or another item identifier from the image of the QR code, such as a QR reader and/or scanner application. After determining the UPC, SKU, internet address, and/or another item identifier, universal shopping cart device 140 may then identify an item associated with the item identifier based on the associated item identifier.

As an additional example, if universal shopping cart device 140 acquired an image at step 410 (e.g., an image of a product), universal shopping cart device 140 may determine text from the image. In some embodiments, universal shopping cart device 140 may determine the text of the image using optical character recognition (OCR). Universal shopping cart device 140 may determine the text of the image using one or more open-source and/or commercial applications, such as OCR applications.

As a further example, if universal shopping cart device 140 acquired a video at step 410 (e.g., a video of a product), universal shopping cart device 140 may determine an image, a sound, and/or text from the image (e.g., associated item identifier). In some embodiments, universal shopping cart device 140 may determine the image, sound, and text from the video by using one or more techniques to capture the image, sound, and text from the video. Universal shopping cart device 140 may determine the image, sound, and text from the video using one or more open-source and/or commercial applications. Although the above examples are provided, other techniques known to those of ordinary skill in the art may also be used to identify one or more associated item identifiers from an identifier; thus, present disclosure is not limited to the examples provided.

Universal shopping cart device 140 may identify the item associated with the identifier by utilizing the item identifier or an associated item identifier to search one or more databases, servers, and/or cloud services (e.g., database 240, cloud service 250, etc.), conduct an internet look-up, use an application programmable interface, or perform any other techniques known by one of ordinary skill in the art. Thus, universal shopping cart device 140 may identify the item using the item identifier (or associated item identifier) to look up the item.

In certain embodiments, universal shopping cart device 140 may calculate a similarity score based on how similar the item identifier (or associated item identifier) is to one or more attributes (e.g., text, sound, images, or the like associated with an item) of a number of items. Universal shopping cart device 140, in some embodiments, may then choose an item most similar to the item identifier (or associated item identifier) based on the calculated similarity scores. For example, if item identifier is an image, universal shopping cart device 140 may calculate a similarity score by matching the image to a second image among a plurality of images. Universal shopping cart device 140 may match one or more properties of the image, such as color saturation, number of pixels in the image, etc. In some embodiments, universal shopping cart device 140 may also use other techniques, such as matching a logo within the image, matching the placement of objects in the image, using optical character recognition to match text in the image, using facial recognition to match faces (e.g., action figures, people, brands information, or the like.) in the images, etc. The similarity score may be represented as a vectors. In some embodiments, each vector component may represent a different property (e.g., image property) and/or technique used to match between the image and a second image.

Additionally or alternatively, universal shopping cart device 140 may identify an item associated with the item identifier based on a user selection. For example, universal shopping cart device 140 may provide a list of suggested items to user device 110. Universal shopping cart device 140 may determine the list of suggested items based on choosing items whose calculated similarity score is above a predetermined threshold. In some embodiments, universal shopping cart device 140 may provide ranked items to user device 110 based on each item's calculated similarity score. Universal shopping cart device 140 may then receive a selection of an item from the ranked items from user device 110 and identify the selected item as the item associated with the item identifier.

At step 430, universal shopping cart device 140 may acquire one or more merchants associated with each of one or more items. A merchant may be associated with an item when the merchant offers the item for sale. In some embodiments, the merchant may be registered with universal shopping cart device 140. Universal shopping cart device 140 may acquire one or more merchants associated with an item by, for example, searching for a merchant offering the item for sale using one or more database, servers, cloud services (e.g., database 240, cloud service 250, etc.), the internet, an application programmable interface, and/or any other techniques known by one of ordinary skill in the art.

In some embodiments, universal shopping cart device 110 may acquire the merchant by scraping one or more electronic platforms associated with the merchant and/or another plurality of merchants. Universal shopping cart device 140 may identify one or more attributes, such as a price of the item offered by a merchant on one or more of the electronic platforms, in scraped data. Universal shopping cart device 140 may then identify the merchant based on the attributes, such as selecting the merchant based on the price being above a threshold, selecting the merchant based on the price being nonzero or defined, etc.

At step 440, universal shopping cart device 140 may determine which of the one or more merchants (determined for each item in step 430) from which to purchase the one or more items. In some embodiments, universal shopping cart device 140 may determine a merchant from which to purchase an item based on one or more user preferences, such as those acquired by process 300. For example, universal shopping cart device 140 may determine to purchase an item from a particular merchant of the one or more merchants based on the merchant providing the most or least expensive shipping method, the longest or quickest shipping methods, the most or least discounts, the most or least promotional offers, etc.

Universal shopping cart device 140 may also determine to purchase an item from a particular merchant of the one or more merchants based on data received from user device 110, such as GPS data, and/or one or more user preferences. For example, universal shopping cart device 140 may acquire a device location (e.g., GPS data) from user device 110 and use the device location to determine whether a merchant provides the longest, shortest, most expensive, and/or least expensive shipping method.

Figure 5:
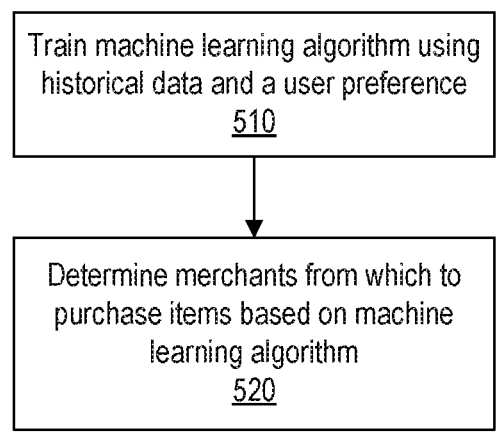
FIG. 5 is a flowchart illustrating an exemplary data retrieval process, consistent with disclosed embodiments.

Turning to FIG. 5, in step 440, universal shopping cart device 140 may, additionally or alternatively, utilize a user preference not previously acquired, such as those previously in process 300. For example, universal shopping cart device 140 may determine user preferences based on machine learning and one or more historical purchase transactions and/or transaction data of the user processed by universal shopping cart 140 and/or an external e-commerce platform. Universal shopping cart device 140 may train a machine learning model using information on historical purchase transactions made by the user (at step 510). In some embodiments, the information on historical purchase transactions includes information on items that the user has purchased and merchants where the user has made transactions. Based on the machine learning module, universal shopping cart device 140 may then determine the user preference, such as one corresponding to the user preferences acquired in step 300 (at step 520).

As another example, universal shopping cart device 140 may determine to purchase an item for a user from a particular merchant based on a user preference (e.g., an aggregated user preference) that is based on one or more user preferences of a plurality of users and/or using transaction data and/or user data from a plurality of users. Universal shopping cart device 140 may determine a user preference based on machine learning and one or more historical purchase transactions and/or transaction data of a plurality of users processed by universal shopping cart 140 and/or an external e-commerce platform. For example, turning to FIG. 6, universal shopping cart device 140 may train a machine learning model using information on historical purchase transactions made by a plurality of users (at step 610). In some embodiments, universal shopping cart device 140 may train the machine learning model to identify items that the plurality of users has purchased from a set of merchants. Based on the machine learning module, universal shopping cart device 140 may then determine the aggregated user preference, such as a user preference corresponding to one of the user preferences acquired in step 300 (at step 620).

In some embodiments, the plurality of users may be related to the user and/or may include the user. To identify a related user, universal shopping cart device 140 may identify the plurality of users based on determining that the plurality of users are related to the user by calculating a commonality score for each of the plurality of users to the user and, optionally, comparing the commonality score to a threshold commonality score. In some embodiments, calculating the commonality score may include calculating the commonality score based on commonalities between the user data, transaction data, or the like, between the user and the plurality of users.

Returning to FIG. 4, at step 450, universal shopping cart device 140 may provide the one or more determined merchants and/or the one or more items associated with the merchant to the user device 110. In some embodiments, universal shopping cart 140 may provide the particular merchant (determined in step 440) for each item. In some embodiments, universal shopping cart 140 may repeat the steps of 440 a number of times to provide a number of particular merchants for each item. When providing the merchants for each item to user device 110, universal shopping cart 140 may store the merchants for each item to user data associated with a user profile associated with the user.

At step 460, universal shopping cart device 140 may receive an indication of an order from user device 110. In some embodiments, the user of user device 110 may select, using one or more I/O devices 220 of user device 110, the one or more merchants and/or the one or more items that the user would like to receive from the one or more merchants. The user of user device 110 may select, for example, one or more of the items, and/or a merchant from the one or more particular merchants determined in step 440. In certain embodiments, the selection of an item for each merchant may create an indication of an order. The indication of the order may include one or more items, and each of the one or more items may identify a merchant that the user wishes to purchase the one or more items from. Additionally or alternatively, the indication of the order may include one or more merchants, and each of the one or more merchants may identify one or more items that the user wishes to purchase from the one or more merchants.

At step 470, universal shopping cart device 140 may generate one or more payment tokens to purchase one or more items from one or more merchants. In some embodiments, universal shopping cart device 140 may generate a payment token based on the indication of the order. However, in other embodiments, universal shopping cart device 140 may not receive an indication of an order, so universal shopping cart device 140 may generate a payment token to purchase one or more items based on the one or more merchants from which to purchase the one or more items as determined in, for example, step 440.

Universal shopping cart device 140 may configure the payment token to include, for example, data associated with the item, the merchant from which the item will be purchased, the form of payment used to purchase the item, the price of the item, and/or shipment of the item. Universal shopping cart device 140 may, additionally or alternatively, configure the payment token to include other information, such as other user data, transaction data, merchant data, other data, or the like. In some embodiments, the data configured in the two payment tokens may be different. Universal shopping cart device 140 may encrypt the payment token and/or data within the payment token. In some embodiments, universal shopping cart device 140 may encrypt some but not all of the data in the payment token. For example, universal shopping cart device 140 may encrypt data associated with the form of payment used to purchase the item but not encrypt data associated with the price of the item.

At step 480, universal shopping cart device 140 may transmit (e.g., submit) the generated one or more payment tokens to one or more merchants. Universal shopping cart device 140 may submit payment associated a payment token to the merchant identifier in the payment token. In some embodiments, universal shopping cart device 140 may submit the payment token to the merchant using an application programmable interface (API). The API may be associated with the merchant or another system able to buy the item (e.g., the item identified in the payment token) from the merchant.

In some, universal shopping cart device 140 may transmit the payment to the merchant via an electronic transaction form associated with the merchant. In some embodiments, universal shopping cart device 140 may scrape an electronic document (e.g., a website) that is associated with the merchant. The electronic document may include a website used to buy items from the merchant. Universal shopping cart device 140 may identify an electronic transaction form in the electronic document. In some embodiments, universal shopping cart device 140 may identify the electronic form by identifying attributes of an electronic transaction form (e.g., the "form" Hypertext Markup Language tag, Cascading Style Sheet identifiers and/or classes identifying the styling for a form, etc.). Universal shopping cart device 140 may parse the electronic transaction form. In some embodiments, universal shopping cart device 140 may identify a field associated with the electronic form from the electronic transaction form. Universal shopping cart device 140 may insert data from the payment token in the field using one or more computer programming languages, such as HTML, JavaScript, etc. Universal shopping cart device 140 may also transmit the payment to the merchant via the electronic transaction form with the inserted data associated with the merchant.

At step 490, universal shopping cart device 140 may receive one or more notifications from the one or more merchants. The notifications may indicate a success, failure, fraud, an error, and/or the like associated with the transmission of the payment token to the one or more merchants (at step 480).

It should be understood that one or more steps may be added or deleted to implement process 400. For example, universal shopping cart device 140 may or may not respond to the one or more notifications. For example, in a number of embodiments, universal shopping cart device 140 may receive a notification from a first merchant that a first payment token has been accepted and receive a second response from the second merchant that a second payment has not been accepted. In response to receiving the first and second notifications, universal shopping cart device 140 may transmit a third notification indicating that the first payment has been accepted. In certain embodiments, universal shopping cart device 140 may receive a first response from the first merchant that a first payment has been accepted and receive a second response from the second merchant that a second payment has been accepted. In response to receiving the first and second responses, universal shopping cart device 140 may transmit to the user a notification indicating that the transaction has been completed.

Additionally or alternatively, universal shopping cart device 140 may also generate a report, such as a receipt, either before or after receiving one or more notifications from the one or more merchants. In some embodiments, after receiving one or more notifications from one or more merchants concerning all of the transmitted payment tokens, universal shopping cart device 140 may generate a receipt identifying each item, the price of each item, and/or the particular merchant who received the payment token for the one or more items.

Figure 6:
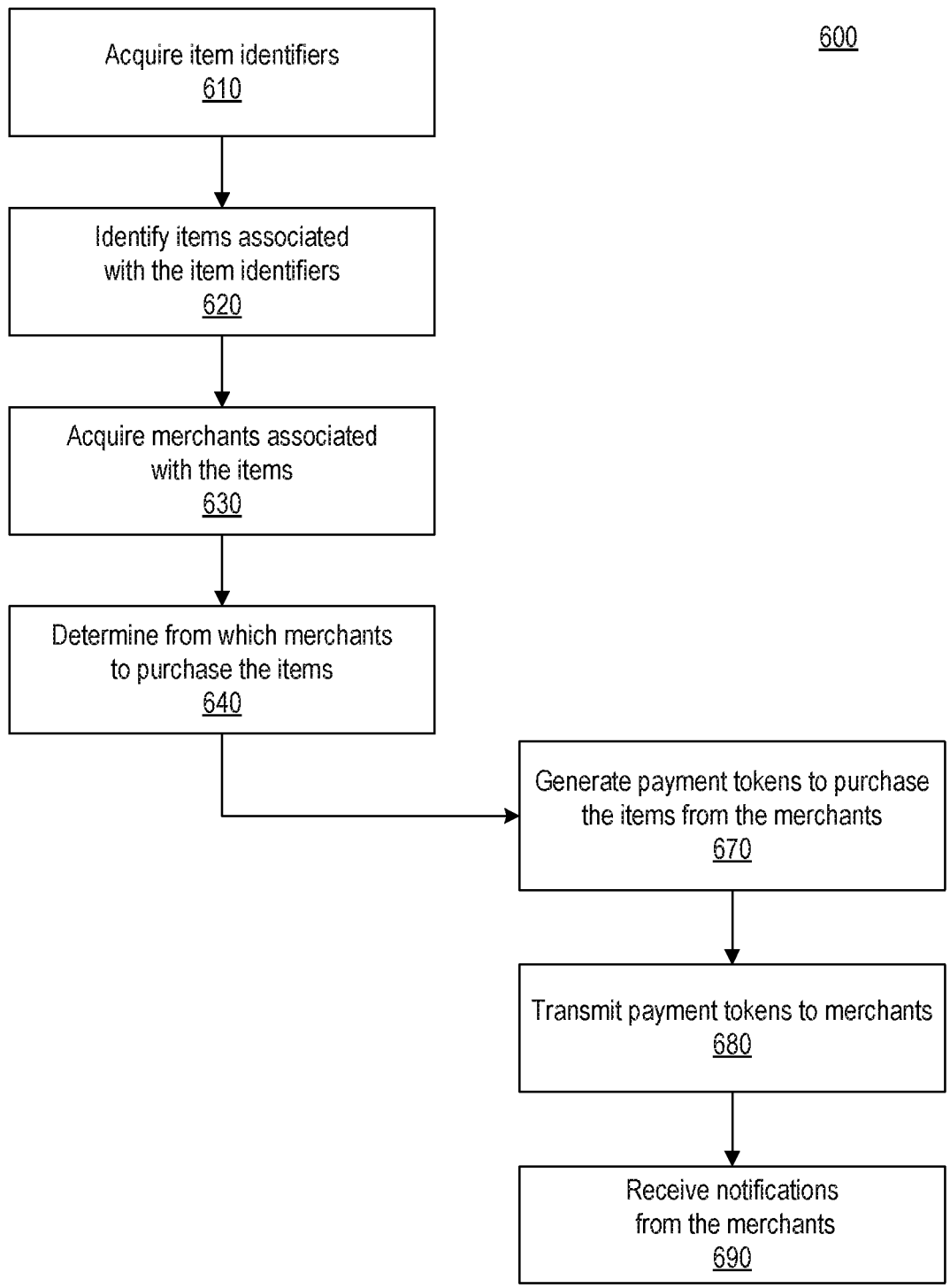
FIG. 6 is a flowchart illustrating an exemplary order process in accordance with disclosed embodiments.

FIG. 6 is a flowchart illustrating an exemplary order process 600 in accordance with disclosed embodiments. Process 600 may be similar to process 400. However, process 600, unlike process 400, may not include steps corresponding to steps 450 and 460. Therefore, process 600 may purchase items from merchants for the user without providing merchants and/or items to the user device and receive an indication of an order, that is, process 600 may purchase items automatically. Steps 610, 620, 630, 640, 670, 680, and 690 may be implemented by universal shopping cart device 140 using techniques similar to, for example, steps 410, 420, 430, 440, 470, 480, and 490, respectively. e.g., as a friend, as a family member, as an associate, etc.)

Figure 7:
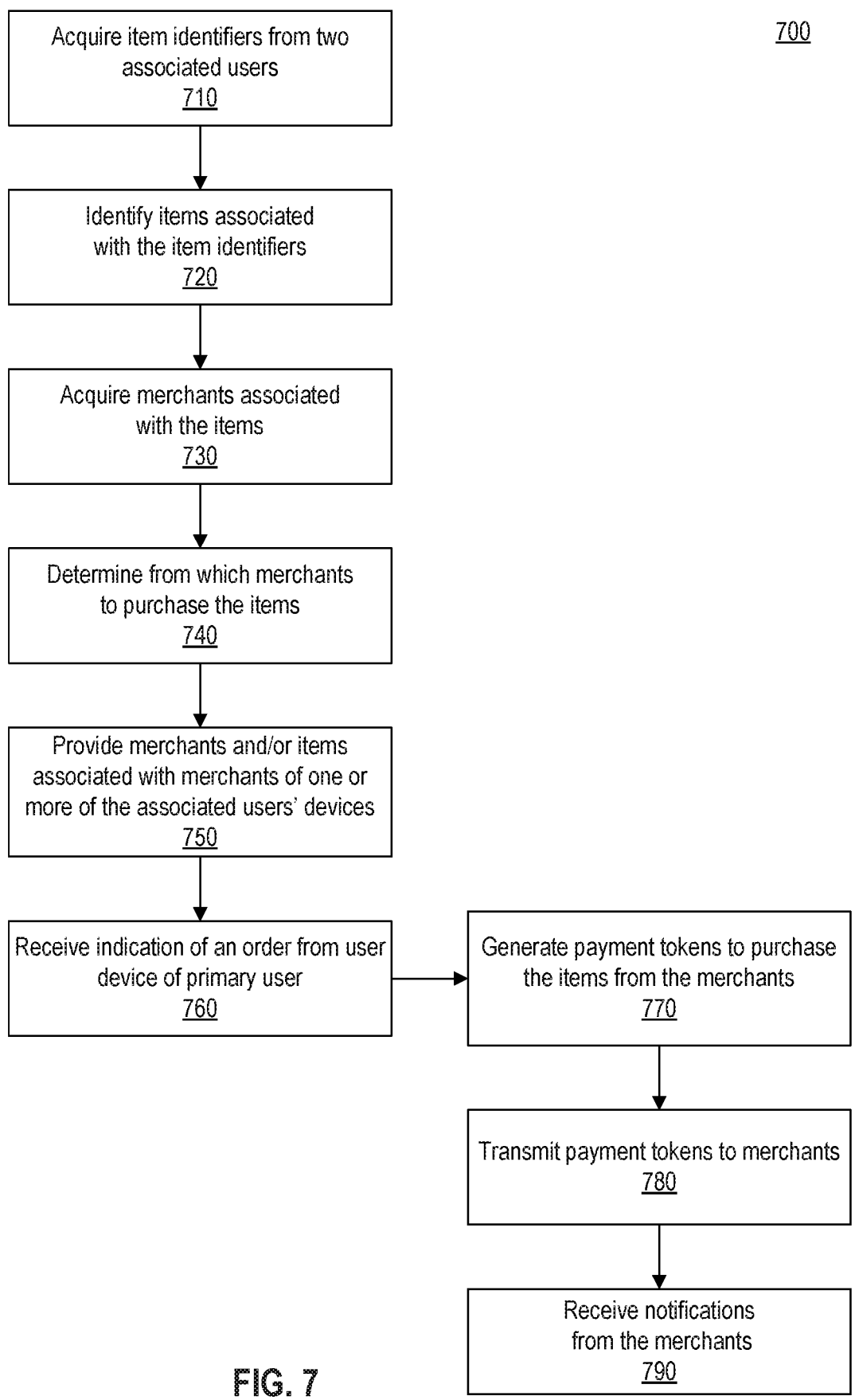
FIG. 7 is a flowchart illustrating an exemplary associated order process in accordance with disclosed embodiments.

FIG. 7 is a flowchart illustrating an exemplary associated order process 700 in accordance with disclosed embodiments. Process 700 may be similar to process 600. However, process 700, unlike process 600, may include processing orders for two or more associated users. As stated above, associated users may include two or more users whom the systems and/or the users have identified as friends, family members, associates, or the like. Two or more associated users may include at least one primary user. The primary user may control whether or not to accept the order. For example, universal shopping cart device 140 may only receive an indicator of an order from the device of the primary user (or users) at 760 before transmitting the payment tokens to the merchants at step 780. With this in mind, steps 710, 720, 730, 740, 750, 760, 770, 780, and 790 may be implemented by universal shopping cart device 140 using techniques similar to, for example, steps 410, 420, 430, 440, 450, 460, 470, 480, and 490, respectively. e.g., as a friend, as a family member, as an associate, etc.). One of ordinary skill in art would know how to distinguish a primary user of the associated users from the non-primary associated users, the device of the primary user of the associated users from the devices non-primary associated users, and/or notifications, responses, or transmission of the primary users from notifications, responses, or transmission of the non-primary users.

Figure 8:
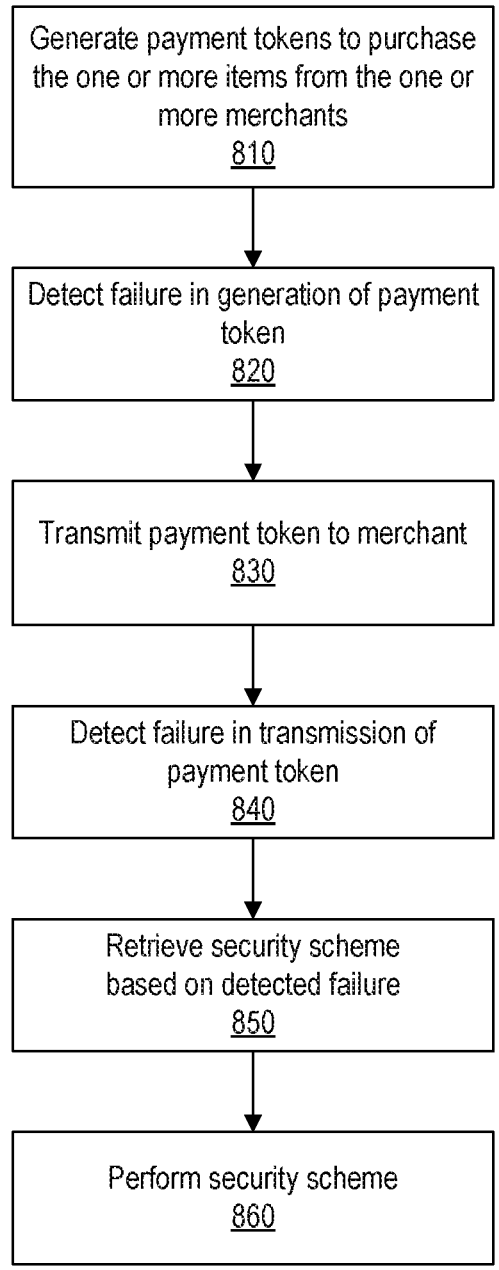
FIG. 8 is a flowchart illustrating an exemplary failure detection process, consistent with disclosed embodiments.

FIG. 8 is a flowchart illustrating an exemplary failure detection process 800, consistent with disclosed embodiments. In some embodiments, processor 210 of, for example, universal shopping cart device 140 may execute instructions encoded on a computer-readable storage medium to perform steps of failure detection process 800. It should also be understood, however, that one or more steps of process 800 may be implemented by other components of system environment 100 (shown or not shown), including user device 110, merchant device 120, and/or financial service provider device 130.

At step 810, universal shopping cart device 140 may generate payment tokens to purchase the one or more items from the one or more merchants using techniques similar to those in, for example, step 470 of process 400. At step 820, universal shopping cart device 140 may detect a failure in the generation of the payment token. In some embodiments, universal shopping cart device 140 may detect failure in generation of the payment token based on determining that an item is not being offered by an identified merchant, an item is not being offered by the merchant at a particular price, the merchant does not exist, the payment of the user isn't valid, shipping costs do not match the actual shipping costs, the payment address is wrong, or the like. Universal shopping cart device 140 may use or query (by searching, sending notifications, etc.) one or more of database 240, cloud service 250, user device 110, merchant device 120, and/or financial service provider 130 to the detect failure in the generation of the payment token.

At step 830, universal shopping cart device 140 may transmit one or more payment tokens to one or more merchants using techniques similar to those in, for example, step 480 of process 400. At step 840, universal shopping cart device 140 may detect a failure in transmission of payment token. In some embodiments, universal shopping cart device 140 may detect failure in transmission of payment token based on determining that an item is not being offered by an identified merchant, an item is not being offered by the merchant at a particular price, the merchant does not exist, the payment of the user isn't valid, shipping costs do not match the actual shipping costs, the payment address is wrong, or the like. Universal shopping cart device 140 may use or query (by searching, sending notifications, etc.) one or more of database 240, cloud service 250, user device 110, merchant device 120, and/or financial service provider 130 to the detect failure in the generation of the payment token.

In certain embodiments, universal shopping cart device 140 may detect a failure in transmission of payment token by receiving one or more notifications of failure from the merchant and/or merchant device 120. For example, universal shopping cart device 140 may receive a notification from merchant device 120 that detects that the item cannot be shipped, the item may be delayed, an item is not being offered by an identified merchant, an item is not being offered by the merchant at a particular price, the merchant does not exist, the payment of the user isn't valid, shipping costs do not match the actual shipping costs, the payment address is wrong, or the like. In some embodiments, universal shopping cart device 140 may detect failure in transmission of payment token based on detecting that transmission method has changed and/or is invalid (e.g., merchant form has been changed and/or is invalid, merchant API has changed, address of merchant form and/or address of merchant form has changed or is invalid, etc.).

At step 850, universal shopping cart device 140 may retrieve a security scheme from a source (e.g., database 240, cloud service 250, merchant device 120, and/or financial service provider 130). Universal shopping cart device 140 may retrieve the security scheme from a particular source based on the detected failure in generation of a token and/or in transmission of the payment token. For example, if universal shopping cart device 140 detects that a failure in generation of a payment token is due to an issue with the payment method of a user, universal shopping cart device 140 may retrieve a security scheme from user device 110 and/or financial service provider 130. As another example, if universal shopping cart device 140 detects that a failure in transmission of the payment token, universal shopping cart device 140 may retrieve a security scheme from database 240, cloud service 250, and/or merchant device 120.

At step 860, universal shopping cart device 140 may perform the security scheme retrieved in, for example, step 850. For example, if the security scheme determines that there is a failure generating a payment token for a particular merchant or transmitting the payment token to the merchant, universal shopping cart device 140 may refund the payment of the item from the particular merchant to the user, refund all the payments of all items to the user regardless of the merchant, generate a payment token to order another item from another identified merchant (e.g., reprocess one or more steps of 440-480 in process 400), rescrape the electronic document to transmit the payment via an updated form, etc. As an example, if the security scheme determines that there is a failure generating a payment token using a particular payment or transmitting the payment token to the merchant using the particular payment, universal shopping cart device 140 may change the payment methods in accordance with financial service provider device 130, report the payment method as a fraud to financial service provider device 130, send a request to user device 110 to obtain a different payment method, notify user device 110 that the payment method does not work, etc. One of ordinary skill in the art will know how to combine, add, delete, and complete in different ways any of the steps of process 800.

In some embodiments, some or all of the logic for the above-described techniques may be implemented as a computer program, as an application, or as a plug-in module or sub-component of another application. The described techniques may be varied and are not limited to the examples or descriptions provided. In some examples applications may be developed for download to mobile communications and computing systems, e.g., laptops, mobile computers, tablet computers, smartphones, etc., being made available for download by the customer either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods (e.g. 400, 440, 500, 600, 700, 800) illustrated in the attached drawings, the order and sequence of steps may be modified or combined, and/or steps may be added or deleted.

Thus, the foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, while a financial service provider has been described herein as the entity generating, providing, managing, and/or maintaining the transaction card management program for one or more customers, it is to be understood that, consistent with disclosed embodiments, another entity may provide such services in conjunction with or separate from a financial service provider.

The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A system for purchasing items using a universal shopping cart, the system comprising:
one or more memory devices storing instructions; and
one or more processors configured to execute instructions to:
acquire, via a communication network, a first item identifier from a first user device of a first user, the first user being a primary user;
acquire, via the communication network, a second item identifier from a second user device of a second user, the second user being associated with the first user and being a secondary user;
identify a first item associated with the first item identifier and a second item associated with the second item identifier;
acquire, via the communication network, a first plurality of merchants and a second plurality of merchants, wherein each of the first plurality of merchants offers the first item for sale, and wherein each of the second plurality of merchants offers the second item for sale;
identify a first user preference associated with the first user and a second user preference associated with the second user
determine an aggregated user preference based on the first user preference, the second user preference, and a commonality score, wherein the commonality score represents a relationship between the first user and the second user;
determine a first merchant from the first plurality of merchants and a second merchant from the first second plurality of merchants based on the aggregated user preference;
provide an option to order the first item from the first merchant and the second option item from the second merchant to the first and second user devices;
receive an indication of an order; and
determine, based on the indication of the order, whether to generate a first payment token and a second payment token, the first payment token generated for transmission to the first merchant to purchase the first item from the first merchant and the second payment token generated for transmission to the second merchant to purchase the second item from the second merchant.

2. The system of claim 1, wherein the indication of the order indicates acceptance by the first user of the option to purchase the first item from the first merchant and the second item from the second merchant; and wherein the one or more processors are further configured to:
generate the first payment token to purchase the first item from the first merchant and the second payment token to purchase the second item from the second merchant; and
transmit, via the communication network, the first payment token to the first merchant and the second payment token to the second merchant.

3. The system of claim 2, wherein instructions to transmit the first payment token are further based on instructions to:
scrape an electronic document associated with the first token;
identify an electronic transaction form in the electronic document;
parse the electronic transaction form;
identify a field associated with the electronic form and information in the first payment token;
insert information from the first payment token into the field; and
transmit the electronic transaction form to the first merchant.

4. The system of claim 2, wherein the one or more processors are further configured to:
configure the first payment token to include a first shipping address, the first shipping address being associated with the first user; and
configure the second payment token to include a second shipping address, the second shipping address being associated with the second user.

5. The system of claim 1, wherein the indication of the order indicates acceptance by the second user of the option to purchase the first item from the first merchant and the second item from the second merchant; and wherein the one or more processors are further configured to:
determine to not generate the first payment token to purchase the first item from the first merchant and the second payment token to purchase the second item from the second merchant.

6. The system of claim 1, wherein the indication of the order is received from the first or second user device.

7. The system of claim 1, wherein the one or more processors are further configured to:
process a first payment to pay for the first item using a transaction card associated with the user; and process a second payment to pay for the second item using the transaction card.

8. The system of claim 1, wherein the first item identifier comprises at least one of a universal product code (UPC), a stock keeping unit (SKU), a quick response code (QR code), an image, a video, text, or a sound.

9. The system of claim 1, wherein the first item identifier is a barcode, and wherein the instructions to identify the first item comprise instructions to:
determine a UPC associated with the first item identifier based on the bar code; and
identify the first item associated with the first item identifier based on the UPC.

10. The system of claim 1, wherein the first item identifier is an image of a product, and the instructions to identify the first item comprise instructions to:
determine text associated with the image of the product based on optical character recognition; and
identify the first item based on the determined text.

11. The system of claim 1, wherein the first item identifier is an image of a product, and the instructions to identify the first item comprise instructions to:
identify the first item based on the image and a similarity score between the image and a second image of a plurality of images.

12. The system of claim 1, wherein the one or more processors are further configured to:
train a machine learning model using information on historical purchase transactions made by the first or second users, wherein the information on historical purchase transactions includes information on items that the first or second users have purchased and merchants where the first or second users have completed transactions; and
determine the aggregated user preference based on the machine learning model.

13. The system of claim 1, wherein the one or more processors are further configured to:
train a machine learning model, using information on historical purchase transactions made by a plurality of users, to identify items that the plurality of users has purchased from a third plurality of merchants; and
determine the aggregated user preference based on the machine learning model.

14. The system of claim 13, wherein the plurality of users are related to the first user, and wherein the one or more processors are further configured to:
determine that the plurality of users are related to the first user by calculating a commonality score for each of the plurality of users to the first user, wherein the commonality score for each of the plurality of users is above a threshold.

15. The system of claim 1, wherein the aggregated user preference identifies a preference based on a distance.

16. The system of claim 1, wherein the aggregated user preference indicates a preference based on shipping costs.

17. The system of claim 1, wherein the instructions to determine a first merchant comprise instructions to:
acquire a location associated with at least one of the first or second user devices; and
determine the first merchant from the first plurality of merchants based on a distance between the first merchant's location and the location of the at least one first or second user device.

18. The system of claim 1, wherein instructions to acquire the first plurality of merchants further comprise instructions to:
scrape a plurality of electronic platforms, each of the one or more platforms being associated with each of a third plurality of merchants;
identify a price of the first item offered by one or more merchants of the third plurality of merchants; and
select the first plurality of merchants based on the price.

19. A method comprising:
acquiring, by one or more processors, a first item identifier from a first device of a first user and a second item identifier from a second device of a second user via a communication network;
identifying, by one or more processors, a first item associated with the first item identifier and a second item associated with the second item identifier;
determining, by one or more processors, a commonality score based on data associated with the first user and data associated with the second user;
determining, by one or more processors, an aggregated user preference based on a first user preference associated with the first user, a second user preference associated with the second user, and the commonality score;
determining, by one or more processors, a first merchant and a second merchant based on the aggregated user preference;
providing, by one or more processors, an option to order the first item from the first merchant and the second item from the second merchant to the first device and the second device;
receiving an indication of an order; and
determining, by one or more processors, whether to generate a first payment token and a second payment token based on the indication of the order, wherein the first payment token comprises data associated with the first item, and wherein the second payment token comprises data associated with the second item.

20. A non-transitory computer-readable media comprising instructions that, when executed by one or more processors, cause operations comprising:
acquiring, via a communication network, a first item identifier from a first device and a second item identifier from a second device;
identifying a first item associated with the first item identifier and a second item associated with the second item identifier;
determining an aggregated user preference based on a first user preference, a second user preference, and a commonality score, wherein the commonality score represents a relationship between a first user associated with the first user preference and a second user associated with the second user preference;
providing a first merchant associated with the first item and a second merchant with the second item to the first device and the second device based on the aggregated user preference; and
determining whether to generate a first payment token and a second payment token based on an indication sent from the first device or the second device, wherein the first payment token comprises data associated with the first item, and wherein the second payment token comprises data associated with the second item.

* * * * *